US012769536B2

(12) United States Patent
Kouge

(10) Patent No.: US 12,769,536 B2
(45) Date of Patent: Oct. 20, 2026

(54) SOFTWARE UPDATING SERVER, SOFTWARE UPDATING SYSTEM, SOFTWARE UPDATING METHOD, AND NON-TRANSITORY STORAGE MEDIUM

(71) Applicant: TOYOTA JIDOSHA KABUSHIKI KAISHA, Toyota (JP)

(72) Inventor: Naoki Kouge, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 277 days.

(21) Appl. No.: 18/623,220

(22) Filed: Apr. 1, 2024

(65) Prior Publication Data

US 2024/0354093 A1 Oct. 24, 2024

(30) Foreign Application Priority Data

Apr. 20, 2023 (JP) ................................ 2023-069263

(51) Int. Cl.
*G06F 8/65* (2018.01)

(52) U.S. Cl.
CPC ..................................... *G06F 8/65* (2013.01)

(58) Field of Classification Search
CPC ... G06F 8/65; G06F 8/71; B60R 16/02; B60R 16/023
USPC ......................................................... 717/168
See application file for complete search history.

(56) References Cited

U.S. PATENT DOCUMENTS

| | | | | |
|---|---|---|---|---|
| 11,736,577 | B2 * | 8/2023 | Nagamitsu | H04L 67/60 709/203 |
| 12,001,825 | B2 * | 6/2024 | Sangameswaran | G06F 8/656 |
| 12,608,190 | B2 * | 4/2026 | Kato | B60W 50/06 |
| 2012/0167071 | A1 * | 6/2012 | Paek | G06F 8/65 717/170 |

(Continued)

FOREIGN PATENT DOCUMENTS

| | | |
|---|---|---|
| JP | 2021-081779 A | 5/2021 |
| JP | 2022-109039 A | 7/2022 |

OTHER PUBLICATIONS

Mahmud, Syed Masud, Shobhit Shanker, and Irina Hossain. "Secure software upload in an intelligent vehicle via wireless communication links." IEEE Proceedings. Intelligent Vehicles Symposium, 2005 . . . IEEE, 2005. pp. 588-593. (Year: 2005).*

(Continued)

*Primary Examiner* — Satish Rampuria
(74) *Attorney, Agent, or Firm* — Oliff PLC

(57) ABSTRACT

A software updating server includes one or more processors configured to execute: transmitting, to a vehicle, one or more campaign notices among a plurality of campaign notices that notifies that software for a control device mounted in the vehicle is updatable; and transmitting, to the vehicle, a new version of the software corresponding to the one or more campaign notices, after transmitting the one or more campaign notices. The plurality of campaign notices includes a first campaign notice that requires approval as an update condition for an update to the new version of the software, and a second campaign notice that requires the approval in a different manner from the first campaign notice, as the update condition for the update to the new version of the software, or that does not require the approval as the update condition for the update to the new version of the software.

9 Claims, 5 Drawing Sheets

(56) References Cited

U.S. PATENT DOCUMENTS

| | | | | |
|---|---|---|---|---|
| 2019/0196806 A1* | 6/2019 | Ewert | .................. | B60R 16/023 |
| 2021/0141631 A1* | 5/2021 | Harata | .................. | G06F 21/572 |
| 2021/0149659 A1* | 5/2021 | Abe | .......................... | G06F 8/65 |
| 2022/0027143 A1* | 1/2022 | Fukuyo | .................. | H04L 67/34 |
| 2022/0222054 A1 | 7/2022 | Sakai | | |

OTHER PUBLICATIONS

Samuel, Justin, et al. "Survivable key compromise in software update systems." Proceedings of the 17th ACM conference on Computer and communications security. 2010.pp. 61-72. (Year: 2010).*

Mugarza, Imanol, et al. "Dynamic software updates to enhance security and privacy in high availability energy management applications in smart cities." IEEE Access 7 (2019): pp. 42269-42279. (Year: 2019).*

Mansour, Karim, Wael Farag, and Mohamed ElHelw. "AiroDiag: A sophisticated tool that diagnoses and updates vehicles software over air." 2012 IEEE International Electric Vehicle Conference. IEEE, 2012. pp. 1-7. (Year: 2012).*

Chowdhury, Thomas, et al. "Safe and secure automotive over-the-air updates." International Conference on Computer Safety, Reliability, and Security. Cham: Springer International Publishing, 2018. pp. 1-15. (Year: 2018).*

Mazloom, Sahar, et al. "A security analysis of an {in-vehicle} Infotainment and App platform." 10th USENIX workshop on offensive technologies (WOOT 16). 2016. pp. 1-12. (Year: 2016).*

* cited by examiner

SOFTWARE UPDATING SERVER, SOFTWARE UPDATING SYSTEM, SOFTWARE UPDATING METHOD, AND NON-TRANSITORY STORAGE MEDIUM

CROSS-REFERENCE TO RELATED APPLICATION

This application claims priority to Japanese Patent Application No. 2023-069263 filed on Apr. 20, 2023, incorporated herein by reference in its entirety.

BACKGROUND

1. Technical Field

The disclosure relates to a software updating server, a software updating system, a software updating method, and a non-transitory storage medium.

2. Description of Related Art

A software updating system described in Japanese Unexamined Patent Application Publication No. 2022-109039 includes an updating server that delivers software, and a vehicle. The vehicle includes a master device and a plurality of control devices. When a software update for a control device is executed, the updating server transmits a campaign notice to the master device. When the campaign notice is acquired and approval for the software update is obtained from a user of the vehicle, the master device executes a process related to the software update for the control device.

SUMMARY

As JP 2022-109039 A discloses, when software for a control device of a vehicle is updated, it is necessary to obtain approval from a user of the vehicle before the updating of the software is completed. Here, in a situation after a vehicle comes onto a market, an owner of the vehicle can be designated as a user of the vehicle. Accordingly, a software update can be executed by the owner of the vehicle, as the user thereof, approving the update. In contrast, in a situation before a vehicle comes onto a market, a person to be a user of the vehicle cannot be designated. Accordingly, when software is updated, it is not necessarily preferable to seek similar approval to that in cases where a user is designated. However, an updating system as in JP 2022-109039 A, even in a situation before a vehicle comes onto a market, seeks user approval as in a situation after a vehicle comes onto a market.

A software updating server according to a first aspect of the present disclosure includes one or more processors configured to execute: transmitting, to a vehicle, one or more campaign notices among a plurality of campaign notices that notifies that software for a control device mounted in the vehicle is updatable; and transmitting, to the vehicle, a new version of the software corresponding to the one or more campaign notices, after transmitting the one or more campaign notices. The plurality of campaign notices includes a first campaign notice that requires approval as an update condition for an update to the new version of the software, and a second campaign notice that requires the approval in a different manner from the first campaign notice, as the update condition for the update to the new version of the software, or that does not require the approval as the update condition for the update to the new version of the software.

A software updating system according to a second aspect of the present disclosure includes: a master device mounted in a vehicle; and an updating server configured to perform wireless communication with the master device. The updating server includes one or more first processors configured to execute: transmitting, to the master device, one or more campaign notices among a plurality of campaign notices that notifies that software for a control device mounted in the vehicle is updatable; and transmitting, to the master device, a new version of the software corresponding to the campaign notices, after transmitting the campaign notices. The plurality of campaign notices includes a first campaign notice that requires approval as an update condition for an update to the new version of the software, and a second campaign notice that requires the approval in a different manner from the first campaign notice, as the update condition for the update to the new version of the software, or that does not require the approval as the update condition for the update to the new version of the software. The master device includes one or more second processors configured to execute: acquiring at least one of the first campaign notice and the second campaign notice; executing the update to the new version of the software after acquiring the first campaign notice and when the update condition corresponding to the first campaign notice is satisfied; and executing the update to the new version of the software after acquiring the second campaign notice and when the update condition corresponding to the second campaign notice is satisfied.

A software updating method according to a third aspect of the present disclosure is executed by an updating server, and includes: transmitting, to a vehicle, one or more campaign notices among a plurality of campaign notices that notifies that software for a control device mounted in the vehicle is updatable; and transmitting, to the vehicle, a new version of the software corresponding to the one or more campaign notices, after transmitting the one or more campaign notices. The plurality of campaign notices includes a first campaign notice that requires approval as an update condition for an update to the new version of the software, and a second campaign notice that requires the approval in a different manner from the first campaign notice, as the update condition for the update to the new version of the software, or that does not require the approval as the update condition for the update to the new version of the software.

A non-transitory storage medium according to a fourth aspect of the present disclosure stores instructions that are executable by one or more processors of an updating server and that cause the one or more processors to execute the software updating method according to the third aspect.

According to the configurations described above, by using the first campaign notice and the second campaign notice differently between, for example, a pre-marketed vehicle for which a specific user is not designated and a post-marketed vehicle for which a specific user is designated, it is possible to use different manners of approval related to a software update between before and after a vehicle comes onto a market.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Schematic Configuration of Updating System

Hereinafter, a first embodiment of the present disclosure is described by following FIG. 1 to FIG. 4. First, a schematic configuration of an updating system US is described.

Figure 1:
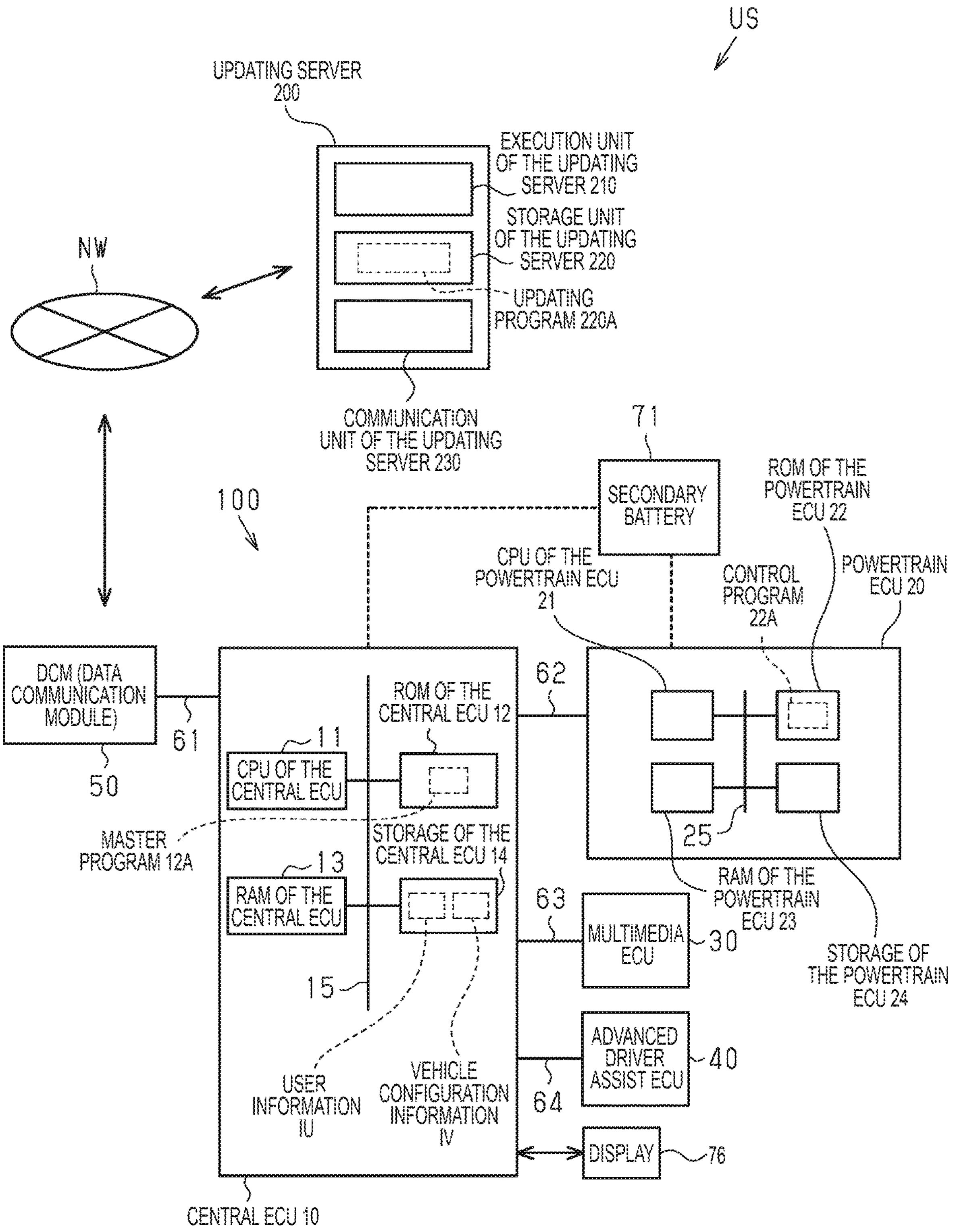
FIG. 1 is a schematic configuration diagram of an updating system according to a first embodiment.

As shown in FIG. 1, the updating system US includes a plurality of vehicles 100. Note that in FIG. 1, only one vehicle 100 is shown representatively. The vehicles 100 may include, for example, a pre-marketed automobile and a post-marketed automobile. Here, "pre-marketed", or "before coming onto a market", refers to, for example, timings before a vehicle 100 is delivered to a buyer, which is a specific user. Accordingly, a pre-marketed vehicle 100 is managed in a production factory or is managed in a dealer shop. "Post-marketed", or "after coming onto a market", refers to, for example, timings after a vehicle 100 is delivered to a buyer. Accordingly, a post-marketed vehicle 100 is managed by the buyer.

The vehicle 100 includes a central ECU 10, a powertrain ECU 20, a multimedia ECU 30, an advanced driver assist ECU 40, and a DCM 50. Moreover, the vehicle 100 includes a first external bus 61, a second external bus 62, a third external bus 63, and a fourth external bus 64. Note that "ECU" is an abbreviation for electronic control unit. "DCM" is an abbreviation for data communication module.

The central ECU 10 controls the overall vehicle 100 in a centralizing manner. The central ECU 10 includes a CPU 11, a ROM 12, a RAM 13, a storage 14, and an internal bus 15. The internal bus 15 connects the CPU 11, the ROM 12, the RAM 13, and the storage 14 communicably to each other. The ROM 12 is an only-read-capable non-volatile memory. The ROM 12 stores various programs and various data beforehand. As one of the various programs, the ROM 12 stores a master program 12A beforehand that is executed when software is updated. The RAM 13 is a volatile memory. The RAM 13 temporarily stores various programs and various data. Using the RAM 13 for a work area, the CPU 11 executes various processes by reading a program in the ROM 12. The CPU 11 executes various processes as a master device by reading the master program 12A. In the present embodiment, the central ECU 10 is an example of the master device.

The storage 14 can store various programs and various data. The storage 14 is an electrically rewritable non-volatile memory. For example, the storage 14 is a NAND flash memory.

The storage 14 stores user information IU beforehand. The user information IU is information indicating whether or not a specific user is registered for the vehicle 100. The specific user is, for example, the buyer of the vehicle 100. In the present embodiment, a timing at which the specific user is registered is a timing at which the vehicle 100 is delivered to the buyer at a dealer shop. Accordingly, in a situation where a specific user is not registered for the vehicle 100, the vehicle 100 is pre-marketed. In a situation where a specific user is registered for the vehicle 100, the vehicle 100 is post-marketed.

The storage 14 stores vehicle configuration information IV beforehand. The vehicle configuration information IV includes software information and vehicle identification information. Here, the software information is information indicating software for each ECU and a version of the software. The vehicle identification information is information indicating a type, an identification number, and the like of the vehicle 100.

The DCM 50 is connected to the central ECU 10 via the first external bus 61. The DCM 50 is capable of wireless communication with external equipment outside of the vehicle 100 via a communication network NW. Accordingly, the central ECU 10 is capable of wireless communication with external equipment outside of the vehicle 100 via the first external bus 61 and the DCM 50.

The powertrain ECU 20 can mutually communicate with the central ECU 10 via the second external bus 62. The powertrain ECU 20 executes various processes for controlling an engine, a transmission, and the like, which are not depicted. The powertrain ECU 20 includes a CPU 21, a ROM 22, a RAM 23, a storage 24, and an internal bus 25. The internal bus 25 connects the CPU 21, the ROM 22, the RAM 23, and the storage 24 communicably to each other. The ROM 22 is a so-called erasable programmable read only memory (EPROM). The ROM 22 stores various programs and various data beforehand. As one of the various programs, the ROM 22 stores a control program 22A beforehand. The control program 22A stored in the ROM 22 can be updated. The RAM 23 is a volatile memory. The RAM 23 temporarily stores various programs and various data. Using the RAM 23 for a work area, the CPU 21 executes various processes by reading a program in the ROM 22. The CPU 21 executes various processes for controlling the engine, the transmission, and the like by reading the control program 22A. In the present embodiment, the powertrain ECU 20 is an example of a control device for which a software update is executed.

The storage 24 can store various programs and various data. The storage 24 is an electrically rewritable non-volatile memory. For example, the storage 24 is a NOR flash memory.

The multimedia ECU 30 can mutually communicate with the central ECU 10 via the third external bus 63. The multimedia ECU 30 controls a navigation system, an audio system, and the like, which are not depicted. The internal configuration of the multimedia ECU 30 is similar to the internal configuration of the powertrain ECU 20. The advanced driver assist ECU 40 can mutually communicate with the central ECU 10 via the fourth external bus 64. The advanced driver assist ECU 40 implements various driving assists by executing various applications. Note that the various applications include an application for adaptive cruising while maintaining an intervehicle distance from a vehicle ahead that is traveling ahead of the vehicle 100, an application for automatically braking to reduce damage to the vehicle 100 from collision, and the like. The internal configuration of the advanced driver assist ECU 40 is similar to the internal configuration of the powertrain ECU 20. Note that the vehicle 100 includes various ECUs, such as a steering ECU, a brake ECU, and a body ECU, which are not depicted. Each of the various ECUs can mutually communicate with the central ECU 10 via a bus.

As shown in FIG. 1, the vehicle 100 includes an equipment group including a plurality of equipment. Examples of the equipment include a secondary battery 71 and a display 76. The secondary battery 71 supplies electricity to the central ECU 10, the powertrain ECU 20, the multimedia ECU 30, the advanced driver assist ECU 40, the DCM 50, and the like. Note that in FIG. 1, only an electricity path connecting the secondary battery 71 and the central ECU 10, and an electricity path connecting the secondary battery 71 and the powertrain ECU 20 are shown representatively.

The display 76 can display various information. The display 76 is a so-called touch panel display. Accordingly, a user of the vehicle 100 can input various information via the display 76. In other words, the display 76 functions as output equipment that outputs information to the user, and also as input equipment that receives information from the user.

The central ECU 10 causes the display 76 to display various information by outputting a control signal to the display 76. The central ECU 10 acquires, from the display 76, information input by the user of the vehicle 100.

As shown in FIG. 1, the updating system US includes an updating server 200. The updating server 200 includes an execution unit 210, a storage unit 220, and a communication unit 230. The communication unit 230 is capable of wireless communication with external equipment outside of the updating server 200 via the communication network NW. The storage unit 220 includes an only-read-capable ROM, a read-write-capable volatile RAM, and a read-write-capable non-volatile storage. The storage unit 220 stores various programs and various data beforehand. As one of the various programs, the storage unit 220 stores an updating program 220A beforehand that is executed when software is updated. The execution unit 210 executes various processes in a software updating method, by reading the updating program 220A in the storage unit 220. Note that an example of the execution unit 210 is a CPU.

The execution unit 210 of the updating server 200 can acquire the user information IU and the vehicle configuration information IV from the central ECU 10 of a vehicle 100 at a specific timing. Note that the specific timing is a timing at which a system of the vehicle 100 is started, which will be described later. Note that the execution unit 210 of the updating server 200 can acquire the user information IU and the vehicle configuration information IV on each vehicle 100 from the central ECUs 10 of the plurality of vehicles 100.

The storage unit 220 of the updating server 200 stores setting information IS related to a campaign notice NC. Here, the campaign notice NC is to notify that software for a control device mounted in a vehicle 100 can be updated. The setting information IS includes information on a type, an identification number, and the like of a vehicle 100 to be targeted by the campaign notice NC. The setting information IS includes information for specifying whether a vehicle 100 for which a specific user is registered is targeted, or a vehicle 100 for which a specific user is not registered is targeted. Hereinafter, a campaign notice NC corresponding to the setting information IS in which it is indicated that a vehicle 100 for which a specific user is registered is targeted, is referred to as a first campaign notice NC1. A campaign notice NC corresponding to the setting information IS in which it is indicated that a vehicle 100 for which a specific user is not registered is targeted, is referred to as a second campaign notice NC2. Note that the setting information IS is set by an administrator of the creation of campaign notices NC inputting the setting information IS into the updating server 200 when a new campaign notice NC is created.

Acquisition Control

Figure 2:
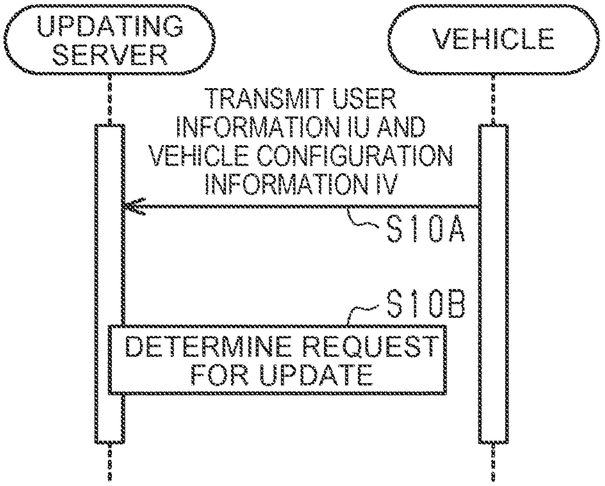
FIG. 2 is a flowchart showing acquisition control according to the first embodiment.

Next, with reference to FIG. 2, acquisition control that is executed by the updating server 200 and the central ECU 10 of a vehicle 100 is described. The acquisition control is control for the updating server 200 to acquire the user information IU and the vehicle configuration information IV. The acquisition control is executed between the single updating server 200 and the central ECUs 10 of a plurality of vehicles 100 individually in parallel. In the present embodiment, the central ECU 10 of the vehicle 100 initiates the acquisition control each time the system of the vehicle 100 is started.

As shown in FIG. 2, when the acquisition control is initiated, the CPU 11 of the central ECU 10 executes a process in step S10A. In step S10A, the CPU 11 of the central ECU 10 transmits the user information IU and the vehicle configuration information IV to the updating server 200. When the execution unit 210 of the updating server 200 acquires the user information IU and the vehicle configuration information IV, the execution unit 210 of the updating server 200 moves the process to step S10B.

In step S10B, the execution unit 210 of the updating server 200 determines, based on the vehicle configuration information IV, whether or not a request for a software update occurs with regard to the vehicle 100. For example, when a version of the control program 22A stored in the storage unit 220 is newer than a version of the control program 22A at the vehicle 100, the execution unit 210 of the updating server 200 determines that a request for a software update occurs with regard to the vehicle 100. Note that the execution unit 210 of the updating server 200 executes updating control, which will be described later, on condition that a request for a software update occurs with regard to the vehicle 100. After step S10B, the execution unit 210 of the updating server 200 terminates the current acquisition control.

Updating Control in Case where Specific User is Registered

Figure 3:
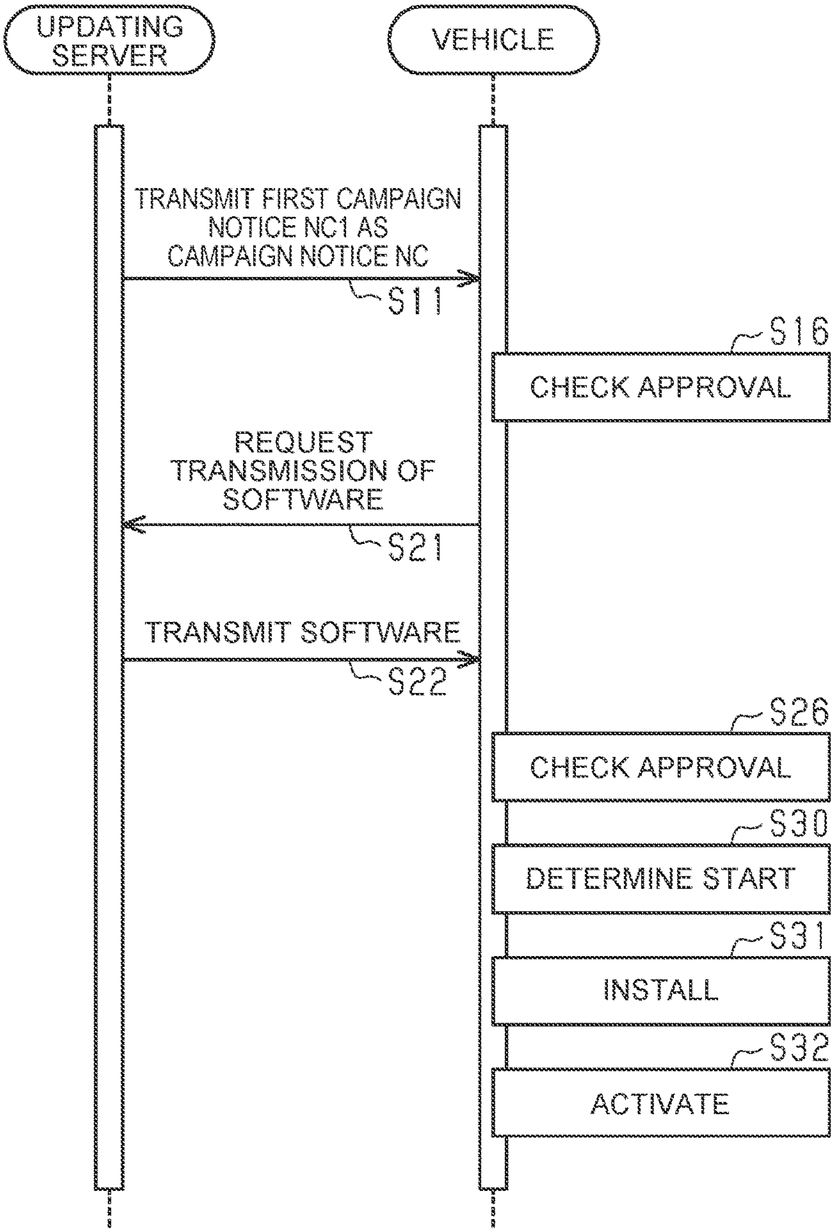
FIG. 3 is a flowchart showing first updating control according to the first embodiment.

Next, with reference to FIG. 3, updating control in a case where a specific user is registered is described. The updating control is control related to a software update for a vehicle 100. Note that hereinafter, the updating control in the case where a specific user is registered is referred to as the first updating control. The first updating control is executed between the updating server 200 and a vehicle 100 for which a specific user is registered. The first updating control is executed between the single updating server 200 and the central ECUs 10 of a plurality of vehicles 100 individually in parallel. In the following, as an example of the software update, processes in a case where the control program 22A is updated are described.

In the present embodiment, when it is determined in the acquisition control that a request for a software update occurs with regard to the vehicle 100 for which a specific user is registered, the execution unit 210 of the updating server 200 initiates the first updating control following the acquisition control.

As shown in FIG. 3, when the first updating control is initiated, the execution unit 210 of the updating server 200 executes a process in step S11. In step S11, the execution unit 210 of the updating server 200 transmits, as a campaign notice NC, the first campaign notice NC1 of the first campaign notice NC1 and the second campaign notice NC2. Accordingly, the execution unit 210 of the updating server 200 transmits the first campaign notice NC1 to the vehicle 100 for which a specific user is registered. Here, the first campaign notice NC1 is a campaign notice NC that requires approval as a condition for an update to new software. The campaign notice NC includes information indicating a type of the software to be updated. Note that in the example described here, the information indicating a type of the software to be updated is information indicated that the software to be updated is the control program 22A for the powertrain ECU 20. When the CPU 11 of the central ECU 10 acquires the campaign notice NC, the CPU 11 of the central ECU 10 moves the process to step S16.

In step S16, the CPU 11 of the central ECU 10 checks with the specific user of the vehicle 100 whether or not the specific user approves execution of download of a new control program 22A in order to update the control program 22A. Specifically, the CPU 11 of the central ECU 10 causes the display 76 to display options of approving and not approving execution of download of the control program 22A by outputting a control signal to the display 76. When approval is not obtained from the specific user of the vehicle 100, the CPU 11 of the central ECU 10 causes the options of approving and not approving execution of download of the control program 22A to be displayed in each constant time period. When approval is obtained from the specific user of the vehicle 100, the CPU 11 of the central ECU 10 moves the process to step S21.

In step S21, the CPU 11 of the central ECU 10 transmits, to the updating server 200, a request signal for requesting transmission of the new control program 22A. When the execution unit 210 of the updating server 200 acquires the request signal, the execution unit 210 of the updating server 200 moves the process to step S22.

In step S22, the execution unit 210 of the updating server 200 transmits the new control program 22A, as new software corresponding to the campaign notice NC, to the central ECU 10. In other words, the CPU 11 of the central ECU 10 downloads the new control program 22A from the updating server 200. At the time, the CPU 11 of the central ECU 10 stores the new control program 22A in the storage 14 of the central ECU 10. After step S22, the CPU 11 of the central ECU 10 moves the process to step S26.

In step S26, the CPU 11 of the central ECU 10 checks with the specific user of the vehicle 100 whether or not the specific user approves execution of installation and activation of the new control program 22A in order to update the control program 22A. Specifically, the CPU 11 of the central ECU 10 causes the display 76 to display options of approving and not approving execution of installation and activation of the control program 22A by outputting a control signal to the display 76. When approval is not obtained from the specific user of the vehicle 100, the CPU 11 of the central ECU 10 causes the options of approving and not approving execution of installation and activation of the control program 22A to be displayed in each constant time period. When approval is obtained from the specific user of the vehicle 100, the CPU 11 of the central ECU 10 moves the process to step S30.

In step S30, the CPU 11 of the central ECU 10 determines whether or not a predetermined start condition is satisfied. Here, an example of the start condition is that the system of the vehicle 100 is in an off state. Note that the system of the vehicle 100 being in the off state refers to a state in which electricity is not supplied to each ECU except for the central ECU 10. Accordingly, a state where the vehicle 100 is traveling and an accessories on state where each equipment of the vehicle 100 can be used are on states. A state where the vehicle 100 is unable to travel is an off state. When the CPU 11 of the central ECU 10 determines in step S30 that the start condition is not satisfied, the CPU 11 of the central ECU 10 executes the process in step S30 again.

When the CPU 11 of the central ECU 10 determines in step S30 that the start condition is satisfied, the CPU 11 of the central ECU 10 moves the process to step S31. In other words, the CPU 11 of the central ECU 10 moves the process to step S31 on condition that approval is obtained in step S16, that approval is obtained in step S26, and that the start condition is satisfied in step S30. Accordingly, update conditions corresponding to the first campaign notice NC1 are that approval is obtained in step S16, that approval is obtained in step S26, and that the start condition is satisfied in step S30.

In step S31, the CPU 11 of the central ECU 10 installs the new control program 22A stored in the storage 14 into the ROM 22 of the powertrain ECU 20. After step S31, the CPU 11 of the central ECU 10 moves the process to step S32.

In step S32, the CPU 11 of the central ECU 10 activates the installed control program 22A. The activation here is to bring the installed control program 22A into an executable state, by changing reference addresses and the like for execution of the control program 22A. After step S32, the CPU 11 of the central ECU 10 terminates the current first updating control.

Updating Control in Case where User is not Registered

Figure 4:
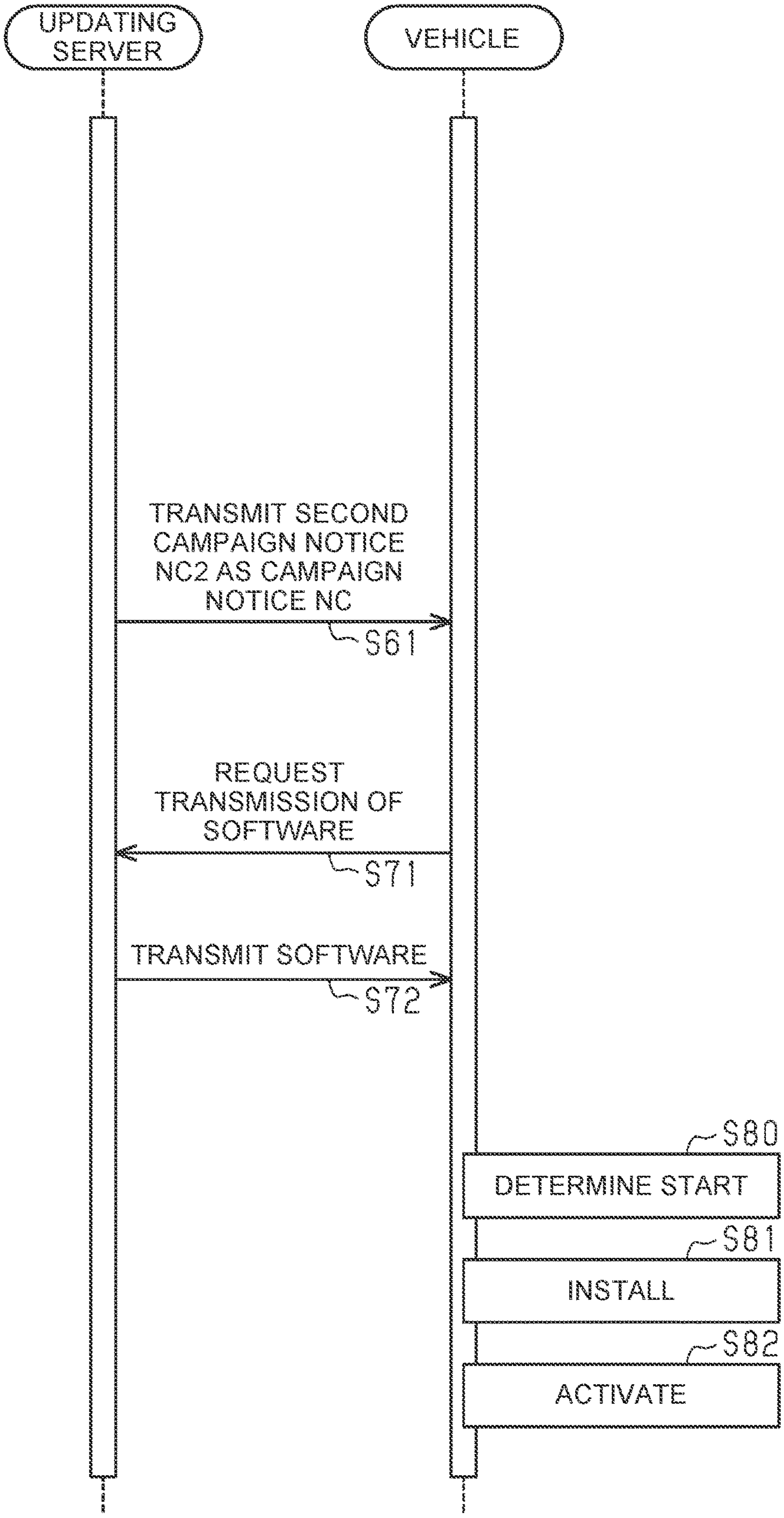
FIG. 4 is a flowchart showing second updating control according to the first embodiment.

Next, with reference to FIG. 4, updating control in a case where a specific user is not registered is described. Note that hereinafter, the updating control in the case where a specific user is not registered is referred to as the second updating control. The second updating control is executed between the updating server 200 and a vehicle 100 for which a specific user is not registered. The second updating control is executed between the single updating server 200 and the central ECUs 10 of a plurality of vehicles 100 individually in parallel.

In the present embodiment, when it is determined in the acquisition control that a request for a software update occurs with regard to the vehicle 100 for which a specific user is not registered, the execution unit 210 of the updating server 200 initiates the second updating control following the acquisition control.

As shown in FIG. 4, when the second updating control is initiated, the execution unit 210 of the updating server 200 executes a process in step S61. In step S61, the execution unit 210 of the updating server 200 transmits, as a campaign notice NC, the second campaign notice NC2 of the first campaign notice NC1 and the second campaign notice NC2. Accordingly, the execution unit 210 of the updating server 200 transmits the second campaign notice NC2 to the vehicle 100 for which a specific user is not registered. In the present embodiment, the second campaign notice NC2 is a campaign notice NC that does not require approval as a condition for an update to new software. As described above, the first campaign notice NC1 is a campaign notice NC that requires approval as a condition for an update to new software. In addition, in the first updating control, a total of two approvals through the processes in step S16 and step S26 are sought when an update is made to new software. Accordingly, an update condition corresponding to the second campaign notice NC2 has a smaller number of times to seek approval than the update conditions corresponding to the first campaign notice NC1. In other words, the number of approvals required as the update condition corresponding to the second campaign notice NC2 is smaller than the number of approvals required as the update condition corresponding to the first campaign notice NC1. When the CPU 11 of the central ECU 10 acquires the campaign notice NC, the CPU 11 of the central ECU 10 moves the process to step S71.

In step S71, the CPU 11 of the central ECU 10 transmits, to the updating server 200, a request signal for requesting transmission of the new control program 22A. When the execution unit 210 of the updating server 200 acquires the request signal, the execution unit 210 of the updating server 200 moves the process to step S72.

In step S72, the execution unit 210 of the updating server 200 transmits the new control program 22A, as new software corresponding to the campaign notice NC, to the central ECU 10. In other words, the CPU 11 of the central ECU 10 downloads the new control program 22A from the updating server 200. At the time, the CPU 11 of the central ECU 10 stores the new control program 22A in the storage 14 of the central ECU 10. After step S72, the CPU 11 of the central ECU 10 moves the process to step S80.

In step S80, the CPU 11 of the central ECU 10 determines whether or not a predetermined start condition is satisfied. Here, an example of the start condition is that the system of the vehicle 100 is in an off state. When the CPU 11 of the central ECU 10 determines in step S80 that the start condition is not satisfied, the CPU 11 of the central ECU 10 executes the process in step S80 again.

When the CPU 11 of the central ECU 10 determines in step S80 that the start condition is satisfied, the CPU 11 of the central ECU 10 moves the process to step S81. In other words, the CPU 11 of the central ECU 10 moves the process to step S81 on condition that the start condition is satisfied in step S80. Accordingly, the update condition corresponding to the second campaign notice NC2 is that the start condition is satisfied in step S80.

In step S81, the CPU 11 of the central ECU 10 installs the new control program 22A stored in the storage 14 into the ROM 22 of the powertrain ECU 20. After step S81, the CPU 11 of the central ECU 10 moves the process to step S82.

In step S82, the CPU 11 of the central ECU 10 activates the installed control program 22A. After step S82, the CPU 11 of the central ECU 10 terminates the current second updating control.

Operations of the Present Embodiment

It is assumed that a specific user is registered for a vehicle 100, and that a request occurs for an update of the control program 22A for the powertrain ECU 20 in the vehicle 100. In such a case, the updating server 200 and the central ECU 10 of the vehicle 100 executes the first updating control as shown in FIG. 3. In step S11, the execution unit 210 of the updating server 200 transmits the first campaign notice NC1 that requires approval as a condition for an update to new software. On condition that approval for execution of download is obtained from the specific user in step S16, the CPU 11 of the central ECU 10 downloads the new control program 22A from the updating server 200 in step S22. Moreover, on condition that approval for execution of installation and the like is obtained from the specific user in step S26, the CPU 11 of the central ECU 10 installs and activates the new control program 22A in step S31 and step S32, respectively.

In contrast, it is assumed that a specific user is not registered for the same vehicle 100 that is described above, and that a request occurs for an update of the control program 22A for the powertrain ECU 20 in the vehicle 100. In such a case, the updating server 200 and the central ECU 10 of the vehicle 100 execute the second updating control as shown in FIG. 4. In step S61, the execution unit 210 of the updating server 200 transmits the second campaign notice NC2 that does not require approval as a condition for an update to new software. Then, without obtaining approval for, for example, execution of download as in step S16, the CPU 11 of the central ECU 10 downloads the new control program 22A from the updating server 200 in step S72. Moreover, without obtaining approval for, for example, execution of installation and activation as in step S26, the CPU 11 of the central ECU 10 installs and activates the new control program 22A in step S81 and step S82, respectively. In other words, in the second updating control, a software update is automatically executed by the updating server 200 and the central ECU 10.

Advantageous Effects of the Present Embodiment (1-1) In the present embodiment, the execution unit 210 of the updating server 200 can transmit campaign notices NC requiring different manners of approval, namely, the first campaign notice NC1 and the second campaign notice NC2. Thus, it is possible to use the first campaign notice NC1 and the second campaign notice NC2 differently between, for example, a post-marketed vehicle 100 and a pre-marketed vehicle 100. As a result, it is possible to use the different manners of approval related to a software update between before and after a vehicle 100 comes onto a market.

(1-2) In step S11 of the first updating control, the execution unit 210 of the updating server 200 transmits the first campaign notice NC1 to the vehicle 100 for which a specific user is registered. In contrast, in step S61 of the second updating control, the execution unit 210 of the updating server 200 transmits the second campaign notice NC2 to the vehicle 100 for which a specific user is not registered. According to such a configuration, the first campaign notice NC1 is transmitted to a vehicle 100 for which a specific user is registered, that is, a post-marketed vehicle 100. In contrast, the second campaign notice NC2 is transmitted to a vehicle 100 for which a specific user is not registered, that is, a pre-marketed vehicle 100. Thus, at the pre-marketed vehicle 100, a software update can be implemented based on the update condition corresponding to the second campaign notice NC2 that is different from the first campaign notice NC1 transmitted to the post-marketed vehicle 100.

(1-3) In general, a post-marketed vehicle 100 is managed by the buyer. In contrast, a pre-marketed vehicle 100 is managed in a production factory or is managed in a dealer shop. In other words, it is likely that a pre-marketed vehicle 100 is managed by the manufacturer of the vehicle 100 and an associated company of the manufacturer. Accordingly, with regard to a pre-marketed vehicle 100, it is less necessary to obtain approval when software is updated, than with regard to a post-marketed vehicle 100.

In the present embodiment, the update condition corresponding to the second campaign notice NC2 has a smaller number of times to seek approval than the update conditions corresponding to the first campaign notice NC1. Thus, when software is updated with regard to a pre-marketed vehicle 100, that is, when software is updated with regard to a vehicle 100 with less necessity to obtain approval, time and effort in connection with approval can be reduced.

(1-4) In the present embodiment, the second campaign notice NC2 is a campaign notice NC that does require approval as a condition for an update to new software. In other words, the number of times to seek approval as an update condition corresponding to the second campaign notice NC2 is zero. Thus, no time and effort is needed in connection with approval when software is updated with regard to a pre-marketed vehicle 100.

Second Embodiment

Hereinafter, a second embodiment of the present disclosure is described by following FIGS. 5 and 6. In the second embodiment, the configuration of the updating system US is partially different from that of the first embodiment. Moreover, the second embodiment is different from the first embodiment in a point that request control, which will be described later, is executed, in addition to the acquisition control, the first updating control, and the second updating control. Further, in the second embodiment, a condition for executing the second updating control is different from that of the first embodiment. Note that a description of the second embodiment is centered on the different points from the first embodiment, and a description of components similar to those of the first embodiment is omitted or simplified by denoting such components by the same reference signs as in the first embodiment.

Schematic Configuration of Updating System

Figure 5:
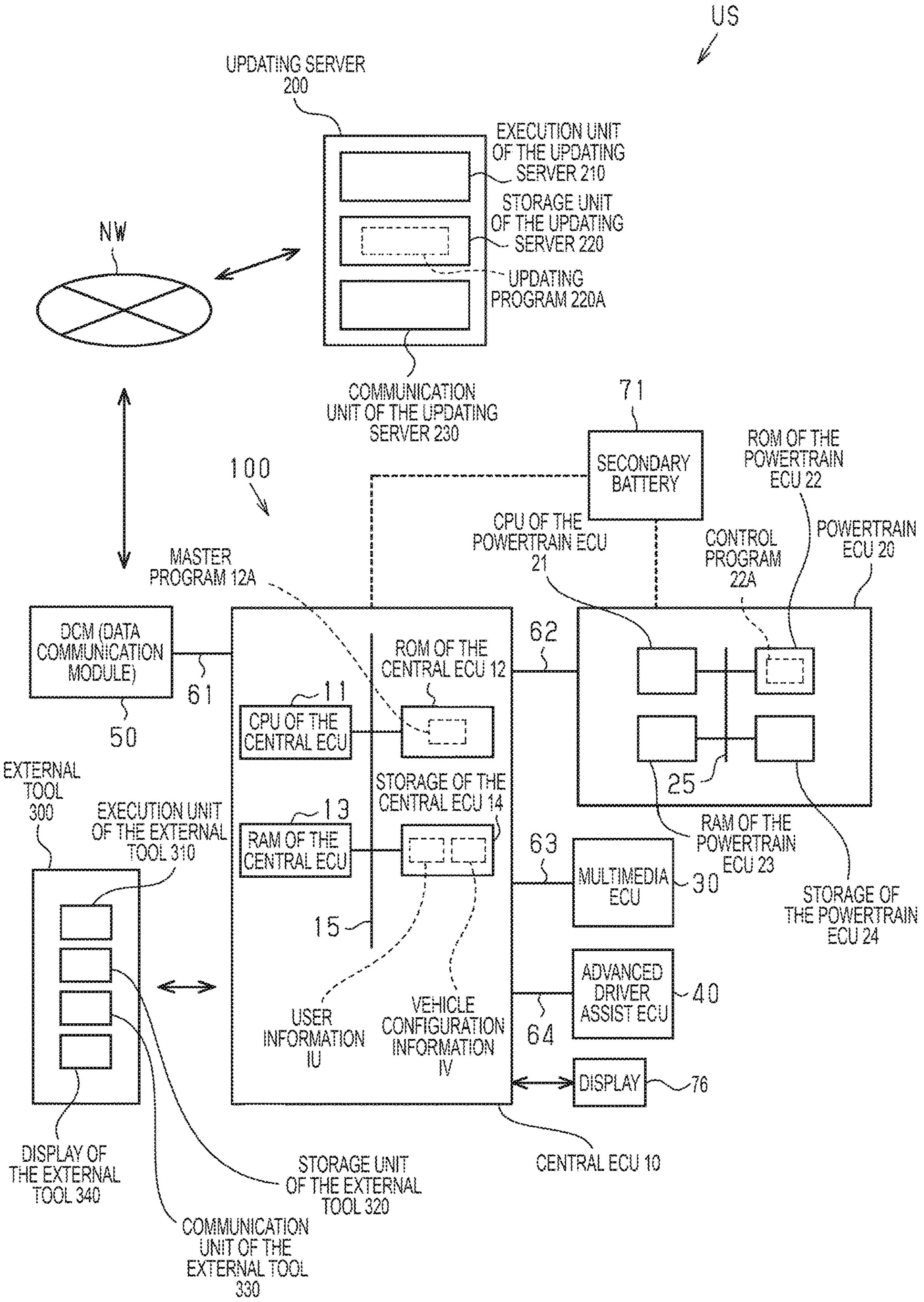
FIG. 5 is a schematic configuration diagram of an updating system according to a second embodiment.

As shown in FIG. 5, the updating system US includes an external tool 300. The external tool 300 is, for example, an operation tool that a worker uses in a production factory to carry out inspection, maintenance, and the like of a vehicle 100. Note that an example of the external tool 300 is a so-called tablet terminal. The external tool 300 includes an execution unit 310, a storage unit 320, a communication unit 330, and a display 340. The communication unit 330 is capable of wired communication with a vehicle 100 via an undepicted connection cable. The storage unit 320 includes a ROM, a RAM, and a storage. The storage unit 320 stores various programs and various data beforehand. The execution unit 310 executes various processes by reading a program in the storage unit 220. Note that an example of the execution unit 310 is a CPU.

The display 340 can display various information. The display 340 is a so-called touch panel display. Accordingly, for example, a worker or the like can input various information via the display 340. In other words, the display 340 functions as output equipment that outputs information to the worker or the like, and also as input equipment that receives information from the worker or the like.

Request Control

Figure 6:
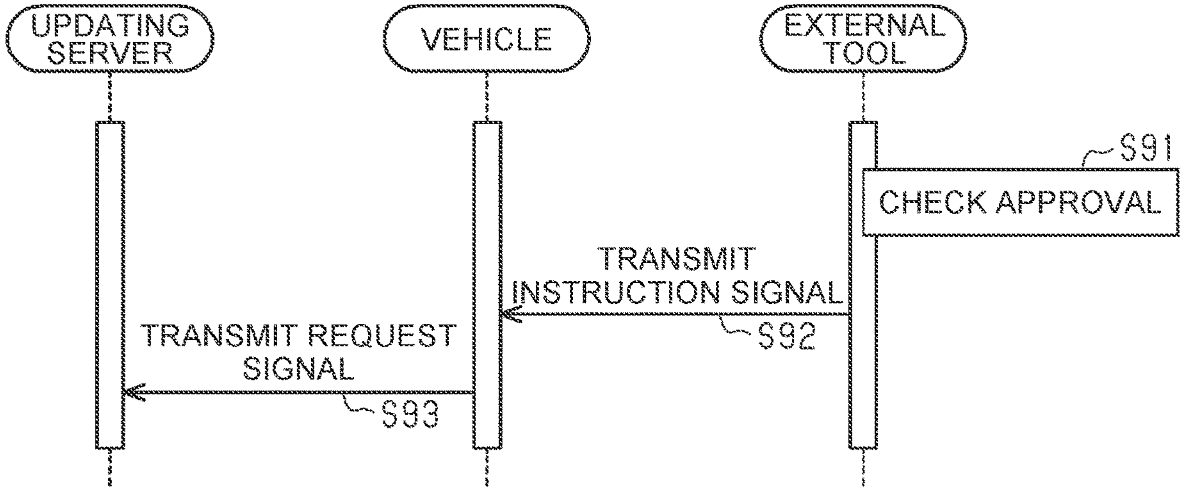
FIG. 6 is a flowchart showing request control according to the second embodiment.

Next, with reference to FIG. 6, the request control that is executed by the external tool 300, the central ECU 10 of a vehicle 100, and the updating server 200 is described. The request control is control for requesting execution of the second updating control. In the present embodiment, the execution unit 310 of the external tool 300 initiates the request control on condition that the external tool 300 and the central ECU 10 of the vehicle 100 are able to communicate via the undepicted connection cable.

As shown in FIG. 6, when the request control is initiated, the execution unit 310 of the external tool 300 executes a process in step S91. In step S91, the execution unit 310 of the external tool 300 checks with a worker operating the external tool 300 whether or not the worker approves execution of a software update. Specifically, the execution unit 310 of the external tool 300 causes the display 340 to display options of approving and not approving execution of a software update by outputting a control signal to the display 340. When approval is not obtained from the worker, the execution unit 310 of the external tool 300 causes the options of approving and not approving execution of a software update to be displayed in each constant time period. When approval is obtained from the worker, the execution unit 310 of the external tool 300 moves the process to step S92.

In step S92, the execution unit 310 of the external tool 300 transmits, to the central ECU 10 of the vehicle 100, an instruction signal for causing a request signal to be transmitted in step S93, which will be described later. When the central ECU 10 of the vehicle 100 acquires the instruction signal, the central ECU 10 of the vehicle 100 moves the process to step S93.

In step S93, the central ECU 10 of the vehicle 100 transmits, to the updating server 200, a request signal for requesting the second updating control, together with the vehicle configuration information IV. When the execution unit 210 of the updating server 200 acquires the request signal, the execution unit 210 of the updating server 200 stores the vehicle configuration information IV and the request signal in the storage unit 220, in association with each other. Accordingly, when a request signal is acquired from a vehicle 100 even once, the updating server 200 assumes with regard to the vehicle 100 that a request signal is already acquired even if a request signal is not acquired again. Thereafter, the execution unit 210 of the updating server 200 terminates the current request control.

Second Updating Control

The execution unit 210 of the updating server 200 initiates the second updating control when in the request control, a request signal is already acquired from a vehicle 100 for which a specific user is not registered, and when in the acquisition control, it is determined that a request for a software update occurs with regard to the vehicle 100. Note that the request control is executed after the acquisition control is executed in some cases, and the acquisition control is executed after the request control is executed in some cases.

As shown in FIG. 4, when the second updating control is initiated, the execution unit 210 of the updating server 200 executes a process in step S61. Note that processes in and after step S61 in the second embodiment are similar to the processes in and after step S61 in the first embodiment. Specifically, as in the first embodiment, on condition that the start condition is satisfied in step S80, the CPU 11 of the central ECU 10 moves the process to step S81. As described above, the execution unit 210 of the updating server 200 initiates the second updating control on condition that a request signal is acquired in step S93 of the request control. In other words, on condition that approval is obtained from the external tool 300, the execution unit 210 of the updating server 200 proceeds with the processes in and after step S61. Accordingly, update conditions corresponding to the second campaign notice NC2 are that the start condition is satisfied in step S80 and that approval is obtained from the external tool 300. Note that in the second embodiment, the process in step S61 is a process of transmitting the second campaign notice NC2 that requires approval in a different manner from the first campaign notice NC1, as a condition for an update to new software.

Advantageous Effect of the Present Embodiment

The present embodiment brings about an advantageous effect (2-1) below, in addition to the advantageous effects (1-1) to (1-3).

(2-1) In the present embodiment, the update conditions corresponding to the second campaign notice NC2 include obtaining approval from the external tool 300. According to such a configuration, a software update can be executed according to approval from the external tool 300 even in a situation where a specific user is not registered for a vehicle 100, that is, a situation where approval from a specific user cannot be obtained. Additionally, by making it necessary to obtain approval from the external tool 300, which is separate equipment that is not mounted in the vehicle 100, the possibility can be reduced that approval is given by an unrelated person who intrinsically has no authority to give approval. Moreover, since it is likely that a pre-marketed vehicle 100 may be in a production factory or a dealer shop, much time and effort is not needed if it is required to connect the external tool 300 to the vehicle 100.

Modifications

The embodiments can be modified and implemented as follows. Any of the embodiments and the following modifications can be combined and implemented within a scope where no technical inconsistency occurs.

In the first embodiment, the first updating control may be changed.

For example, the way of checking approval in step S16 may be changed. As a specific example, the CPU 11 of the central ECU 10 may cause a display of a personal terminal owned by the specific user of the vehicle 100 to display the options of approving and not approving execution of software download by outputting the control signal to the personal terminal. Note that an example of the personal terminal is a so-called smartphone. Similarly, the way of checking approval in step S26 may be changed.

For example, the matter for which approval is checked in step S16 may be changed. As a specific example, instead of approval for execution of download of the new control program 22A, the CPU 11 of the central ECU 10 may check with the specific user of the vehicle 100 whether or not the specific user approves execution of download, installation, and activation. In such a case, the process in step S26 can be omitted.

For example, the matter for which approval is checked in step S26 may be changed. As a specific example, instead of approval for execution of installation and activation of the new control program 22A, the CPU 11 of the central ECU 10 may check with the specific user of the vehicle 100 whether or not the specific user approves execution of download. In such a case, after step S31 and before step S32, the CPU 11 of the central ECU 10 may check with the specific user of the vehicle 100 whether or not the specific user approves execution of activation. As described above, the number of times to seek approval as an update condition corresponding to the first campaign notice NC1 may be changed. The timing of checking approval as an update condition corresponding to the first campaign notice NC1 may be changed.

For example, the start condition in step S30 may be changed. As a specific example, start conditions may be that the system of the vehicle 100 is in an off state and that a time of the process in step S30 is a predetermined scheduled time. Note that the scheduled time may be set by the specific user of the vehicle 100.

In the first embodiment, the second updating control may be changed.

For example, the start condition in step S80 may be changed as in the case of step S30 described above. Note that a start condition or conditions in step S80 may be the same as or may be different from the start conditions in step S30.

In the first embodiment, third updating control may be executed in place of the first updating control and the second updating control. For example, the execution unit 210 of the updating server 200 initiates the third updating control each time a request for a software update occurs with regard to a target vehicle 100. Then, the execution unit 210 of the updating server 200 transmits the first campaign notice NC1 and the second campaign notice NC2 to the central ECU 10 of the vehicle 100. In other words, the CPU 11 of the central ECU 10 receives both the first campaign notice NC1 and the second campaign notice NC2. Then, the CPU 11 of the central ECU 10 determines whether or not a specific user is registered for the vehicle 100 corresponding to the central ECU 10. Here, when the CPU 11 of the central ECU 10 determines that a specific user is registered for the vehicle 100, the CPU 11 of the central ECU 10 executes the processes in and after step S16 of the first updating control. In other words, the CPU 11 of the central ECU 10, when a specific user is registered for the vehicle 100 corresponding to the central ECU 10, executes an update to new software after the first campaign notice NC1 is acquired and when the update conditions corresponding to the first campaign notice NC1 are satisfied. In contrast, when the CPU 11 of the central ECU 10 determines that a specific user is not registered for the vehicle 100, the CPU 11 of the central ECU 10 executes the processes in and after step S71 of the second updating control. In other words, the CPU 11 of the central ECU 10, when a specific user is not registered for the vehicle 100 corresponding to the central ECU 10, executes an update to new software after the second campaign notice NC2 is acquired and when the update condition corresponding to the second campaign notice NC2 is satisfied.

According to such a configuration, at a vehicle 100 for which a specific user is registered, that is, a post-marketed vehicle 100, an update to new software is executed when the update conditions corresponding to the first campaign notice NC1 are satisfied. In contrast, at a vehicle 100 for which a specific user is not registered, that is, a pre-marketed vehicle 100, an update to new software is executed when the update condition corresponding to the second campaign notice NC2 is satisfied. As described above, the CPU 11 of the central ECU 10 uses the first campaign notice NC1 and the second campaign notice NC2 differently depending on before and after the vehicle 100 comes onto a market. Thus, it is possible to use different manners of approval related to a software update between before and after a vehicle 100 comes onto a market.

In the second embodiment, the first updating control may be changed.

For example, as described above, the number of times to seek approval as an update condition corresponding to the first campaign notice NC1 may be changed. In such a case, the number of times to seek approval as an update condition corresponding to the first campaign notice NC1 may be one in total. Here, in the second embodiment, the update conditions corresponding to the second campaign notice NC2 include obtaining approval from the external tool 300. The number of times to seek approval as an update condition corresponding to the second campaign notice NC2 is one in total. Accordingly, the number of times to seek approval as an update condition corresponding to the second campaign notice NC2 may be the same as the number of times to seek approval as an update condition corresponding to the first campaign notice NC1.

In the first embodiment and the second embodiment, the updating system US may be changed.

For example, the master device is not limited to the central ECU 10. As a specific example, instead of the central ECU 10, a CPU of the multimedia ECU 30 may function as a master device by reading the master program 12A stored in a ROM. In other words, for the master device, not only the central ECU 10, but an ECU mounted in a vehicle 100 can be adopted.

For example, the control device is not limited to the powertrain ECU 20. As a specific example, instead of the powertrain ECU 20, the multimedia ECU 30 may be adopted as a control device. In other words, for the control device, not only the powertrain ECU 20, but an ECU mounted in a vehicle 100 can be adopted.

In the second embodiment, the updating system US may be changed.

For example, the communication unit 330 of the external tool 300 may be capable of wireless communication with a vehicle 100.

For example, the external tool 300 may be an operation tool that is used by a worker in a dealer shop. In such a case, the request control may be executed in a situation where a target vehicle 100 is placed in the dealer shop.

What is claimed is:

1. A software updating server comprising one or more processors configured to execute:

transmitting, to a vehicle, one or more campaign notices among a plurality of campaign notices that notifies that software for a control device mounted in the vehicle is updatable;

transmitting, to the vehicle, a new version of the software corresponding to the one or more campaign notices, after transmitting the one or more campaign notices, the plurality of campaign notices including:

a first campaign notice that requires approval as an update condition for an update to the new version of the software, and a second campaign notice that requires the approval in a different manner from the first campaign notice, as the update condition for the update to the new version of the software, or that does not require the approval as the update condition for the update to the new version of the software;

acquiring, from the vehicle, user information indicating whether or not a specific user is registered for the vehicle;

transmitting the plurality of campaign notices to the vehicle;

in a case where the acquired user information indicates that the specific user is registered for the vehicle, controlling the update to the new version of the software such that the update is executable after acquisition of the first campaign notice and when the update condition corresponding to the first campaign notice is satisfied; and in a case where the acquired user information indicates that the specific user is not registered for the vehicle, controlling the update to the new version of the software such that the update is executable after acquisition of the second campaign notice and when the update condition responding to the second campaign notice is satisfied.

2. The software updating server according to claim 1, wherein the one or more processors are configured to execute:

acquiring, from the vehicle, user information indicating whether or not a specific user is registered for the vehicle;

transmitting the first campaign notice to the vehicle for which the specific user is registered; and transmitting the second campaign notice to the vehicle for which the specific user is not registered.

3. The software updating server according to claim 2, wherein the update condition corresponding to the second campaign notice has a smaller number of times to seek the approval than the update condition corresponding to the first campaign notice.

4. A software updating system comprising:

a master device mounted in a vehicle; and an updating server configured to perform wireless communication with the master device, wherein the updating server includes one or more first processors configured to execute:

transmitting, to the master device, one or more campaign notices among a plurality of campaign notices that notifies that software for a control device mounted in the vehicle is updatable; and transmitting, to the master device, a new version of the software corresponding to the campaign notices, after transmitting the campaign notices, the plurality of campaign notices includes a first campaign notice that requires approval as an update condition for an update to the new version of the software, and a second campaign notice that requires the approval in a different manner from the first campaign notice, as the update condition for the update to the new version of the software, or that does not require the approval as the update condition for the update to the new version of the software, and the master device includes:

a storage device that stores user information indicating whether or not a specific user is registered for the vehicle; and one or more second processors configured to execute:

acquiring at least one of the first campaign notice and the second campaign notice;

in a case where the specific user is registered for the vehicle, executing an update to the new version of the software after acquiring the first campaign notice and when the update condition corresponding to the first campaign notice is satisfied, and in a case where the specific user is not registered for the vehicle, executing the update to the new version of the software after acquiring the second campaign notice and when the update condition corresponding to the second campaign notice is satisfied.

5. The software updating system according to claim 4, wherein the one or more first processors of the updating server are configured to execute transmitting the plurality of campaign notices to the master device, and the one or more second processors of the master device are configured to execute acquiring the first campaign notice or the second campaign notice.

6. The software updating system according to claim 5, wherein the one or more second processors of the master device are configured to execute transmitting, to the updating server, user information indicating whether or not a specific user is registered for the vehicle, and the one or more first processors of the updating server are configured to execute:

acquiring the user information from the master device;

transmitting the first campaign notice to the master device of the vehicle for which the specific user is registered; and transmitting the second campaign notice to the master device of the vehicle for which the specific user is not registered.

7. The software updating system according to claim 6, further comprising an external tool that is capable of communication with the master device, wherein the update condition corresponding to the second campaign notice includes obtaining the approval from the external tool.

8. A software updating method executed by an updating server, comprising:

transmitting, to a vehicle, one or more campaign notices among a plurality of campaign notices that notifies that software for a control device mounted in the vehicle is updatable;

transmitting, to the vehicle, a new version of the software corresponding to the one or more campaign notices, after transmitting the one or more campaign notices, the plurality of campaign notices including:

a first campaign notice that requires approval as an update condition for an update to the new version of the software, and a second campaign notice that requires the approval in a different manner from the first campaign notice, as the update condition for the update to the new version of the software, or that does not require the approval as the update condition for the update to the new version of the software;

acquiring, from the vehicle, user information indicating whether or not a specific user is registered for the vehicle;

transmitting the plurality of campaign notices to the vehicle;

in a case where the acquired user information indicates that the specific user is registered for the vehicle, controlling the update to the new version of the software such that the update is executable after acquisition of the first campaign notice and when the update condition corresponding to the first campaign notice is satisfied; and in a case where the acquired user information indicates that the specific user is not registered for the vehicle, controlling the update to the new version of the software such that the update is executable after acquisition of the second campaign notice and when the update condition corresponding to the second campaign notice is satisfied.

9. A non-transitory storage medium storing instructions that are executable by one or more processors of an updating server and that cause the one or more processors to execute a software updating method comprising:

transmitting, to a vehicle, one or more campaign notices among a plurality of campaign notices that notifies that software for a control device mounted in the vehicle is updatable;

transmitting, to the vehicle, a new version of the software corresponding to the one or more campaign notices, after transmitting the one or more campaign notices, the plurality of campaign notices including:

a first campaign notice that requires approval as an update condition for an update to the new version of the software, and a second campaign notice that requires the approval in a different manner from the first campaign notice, as the update condition for the update to the new version of the software, or that does not require the approval as the update condition for the update to the new version of the software;

acquiring, from the vehicle, user information indicating whether or not a specific user is registered for the vehicle;

transmitting the plurality of campaign notices to the vehicle;

in a case where the acquired user information indicates that the specific user is registered for the vehicle, controlling the update to the new version of the software such that the update is executable after acquisition of the first campaign notice and when the update condition corresponding to the first campaign notice is satisfied; and in a case where the acquired user information indicates that the specific user is not registered for the vehicle, controlling the update to the new version of the software such that the update is executable after acquisition of the second campaign notice and when the update condition corresponding to the second campaign notice is satisfied.

* * * * *